United States Patent

[11] 3,571,539

| [72] | Inventors | Herman Kaiser;<br>George W. Goetz, Detroit, Mich. |
|---|---|---|
| [21] | Appl. No. | 753,946 |
| [22] | Filed | Aug. 20, 1968 |
| [45] | Patented | Mar. 23, 1971 |
| [73] | Assignee | Eaton Yale & Towne Inc.<br>Cleveland, Ohio |

[54] COLLISION SENSOR
14 Claims, 9 Drawing Figs.

[52] U.S. Cl. .................................................. 200/61.53,
280/150
[51] Int. Cl. ............................................... H01h 35/14
[50] Field of Search .......................................... 200/61.45,
61.53; 102/7.2 (Digests); 340/262; 180/103;
280/150 (AB)

[56] References Cited
UNITED STATES PATENTS

| 2,897,306 | 7/1959 | Weaver | 200/61.45 |
| 2,997,883 | 8/1961 | Wilkes | 200/61.53 |
| 3,001,039 | 9/1961 | Johnson | 200/61.45 |
| 3,414,292 | 12/1968 | Oldberg et al. | 280/150 |

Primary Examiner—Robert K. Schaefer
Assistant Examiner—M. Ginsburg
Attorney—Yount, & Tarolli ABSTRACT: An improved sensor assembly for actuating a vehicle safety apparatus upon the occurrence of a collision includes a mass which is movable through a distance to a position for actuating the safety apparatus. The mass moves through the aforementioned distance when the vehicle is involved in a collision which could result in injury to an occupant of the vehicle due to impact with a structural part of the vehicle. The mass will not move through the aforementioned distance as a result of the vehicle encountering normal road conditions or during vehicle braking.

PATENTED MAR 23 1971

INVENTORS
HERMANN KAISER
GEORGE W. GOETZ
BY
Yount, Flynn & Tarolli
ATTORNEYS

COLLISION SENSOR

This invention relates to a sensor assembly for actuating a safety device for protecting an occupant of a vehicle during a collision, and more particularly relates to a sensor assembly having a mass which is biased to an inactive position and which moves against the bias to an actuated position for actuating the safety device.

A known safety apparatus includes a confinement which is inflated to restrain movement of an occupant of a vehicle during a collision. Such a safety apparatus is shown in application Ser. No. 562,289 now U. S. Pat. No. 3,414,292, issued Dec. 3, 1968, assigned to the assignee of the present invention. When an automotive vehicle with which this safety apparatus is associated is driven along a rough road or hits a hole in a road, the vehicle is subjected to an instantaneous deceleration or $g$ force which may be of greater magnitude than the deceleration or $g$ force encountered in certain collisions. Under such conditions, the inflation of the confinement would be unnecessary and undesirable. Inflation of the confinement under normal vehicle operating conditions would tend to startle occupants of the vehicle and might even impair to a limited extent the driver's ability to control the vehicle. Therefore, a sensor assembly for effecting inflation of the confinement upon the occurrence of a collision must be able to discriminate between deceleration due to a collision and deceleration caused by normal vehicle braking and road conditions. In addition, the sensor assembly must be constructed so as not to operate due to vibrations which may be induced by normal road conditions.

It has been found that the distinction between deceleration due to road conditions and deceleration due to a collision is not in the magnitude of the deceleration impulse on the vehicle, but rather on the duration thereof. For example, when a vehicle encounters a deep chuck hole in a road, the vehicle may be subjected to a high deceleration for a very short time interval. However, when the vehicle is involved in certain collisions the deceleration may never be as high as when the vehicle hits the chuck hole, but the duration of the deceleration will be much longer. Therefore, a sensor for actuating a safety device for protecting an occupant during a collision must be able to discriminate between the vehicle encountering a collision and encountering road conditions, and it has been discovered that to do so a sensor should be able to distinguish between high and low duration deceleration of even high magnitude. Known accelerometers will not so operate.

Moreover, different types of collisions result in the vehicle encountering different deceleration patterns. For example, in a head-on or barrier type collision, the vehicle may encounter an instantaneous deceleration in excess of that encountered at any time in a collision in the nature of a side swipe. In a collision such as a side swipe the deceleration of the vehicle at any instant may be quite low but of a high duration. Accordingly, a sensor for actuating a safety device must operate in both of these types of collisions for both types of collisions could result in occupant injury.

While it is important that a collision sensor assembly be constructed in such a manner as to be responsive to all types of collisions, and yet nonresponsive to road conditions, it is also important that the sensor assembly operate to activate the safety apparatus at the proper instant during a collision. If the safety apparatus is activated too soon after the instant of impact, the confinement may be inflated and then at least partially deflated before the occupant begins to move forwardly relative to the vehicle due to the collision. Conversely, if the safety apparatus is activated too long after the instant of impact, the occupant may be injured by smashing against a part of the vehicle before the confinement is inflated to restrain or cushion his movement.

Accordingly, an important object of the present invention is the provision of a new and improved collision sensor for actuating a safety device and which is responsive to collisions which may result in the occupant's injury but is nonresponsive to vehicle encountered road conditions.

Moreover, it is an object of this invention to provide a new and improved collision sensor for effecting actuation of safety apparatus to an operated condition upon the occurence of a collision and wherein the collision sensor assembly is constructed in such a manner as to discriminate between deceleration due to a collision and deceleration due to road conditions.

Another object of this invention is the provision of a new and improved collision sensor for actuating a safety apparatus for protecting a vehicle occupant during a collision and which is insensitive to high frequency deceleration, which may result from road conditions, and is also insensitive to low magnitude vehicle deceleration as occurs during vehicle braking.

Still another object of this invention is to provide a new and improved collision sensor assembly which includes a mass movable relative to a casing in response to a collision in a manner similar to the movement of an occupant of the vehicle relative to the vehicle in response to the same collision so that the sensor assembly is operative during a collision to activate a safety apparatus immediately before movement of the occupant relative to the vehicle.

Yet another object of this invention is to provide a new and improved vehicle collision sensor assembly having a spring-biased mass which is movable to an actuated condition upon vehicle deceleration and wherein the mass is biased against an energy-absorbing stop by the spring to minimize vibration of the mass due to road conditions and thereby prevent vibration induced actuation of the collision sensor assembly.

Another object of this invention is to provide a new and improved collision sensor assembly including a mass which is movable through a predetermined distance, against the influence of a biasing spring, from an initial position in abutting engagement with a stop to an actuated position to thereby effect operation of a safety apparatus, and wherein the predetermined distance is between 0.1 of an inch and 1.0 inch and the spring exerts a substantially constant biasing force on the mass, as the mass moves, and which is between 2 to 16 times the weight of the mass.

These and other objects and features of the present invention will become more apparent upon a consideration of the following description of a preferred embodiment of the present invention, taken in connection with the accompanying drawing wherein:

FIG. 6 is a graph illustrating generally the extent of displacement from an initial condition of a spring-biased mass of the sensor assembly when a vehicle with which the sensor assembly is associated is subjected to various types of conditions;

FIGS. 7, 8, 9 are graphs illustrating in a general manner conditions occuring immediately after a collision of a vehicle with rigid post, wherein FIG. 7 illustrates the displacement of the mass of the sensor assembly as a function of elapsed time from the instant of collision of the vehicle with the rigid post, FIG. 8 illustrates the acceleration of the chest of an occupant of the vehicle as a function of elapsed time from the instant of collision, and FIG. 9 illustrates the deceleration of a part of the vehicle on which the sensor assembly is mounted as a function of elapsed time from the instant of collision.

The present invention provides a highly reliable collision sensor assembly for detecting the occurrence of a collision and effecting actuation of a vehicle safety apparatus to an operated condition to protect an occupant of the vehicle. The collision sensor assembly is operated in response to forces resulting from the vehicle encountering a collision, and is capable of distinguishing a collision from vehicle braking, normal road conditions, and minor vehicle impacts which will not cause injury to the occupants of the vehicle. The sensor assembly is nonresponsive to even the relatively large instantaneous deceleration caused by certain road conditions, even though the magnitude of the instantaneous deceleration may exceed the deceleration at any instant during certain collisions. The sensor assembly includes a mass which is biased to an inactive position and moves therefrom during a collision in much the same manner as the occupant of the vehicle moves relative thereto to effect activation of the safety apparatus immediately before the occupant begins to move relative to the vehicle. Although the vehicle safety apparatus and collision sensor assembly are illustrated in the drawing in particular locations on an automotive vehicle, it is contemplated that the safety apparatus and collision sensor assembly could be mounted in other locations.

Figure 1:
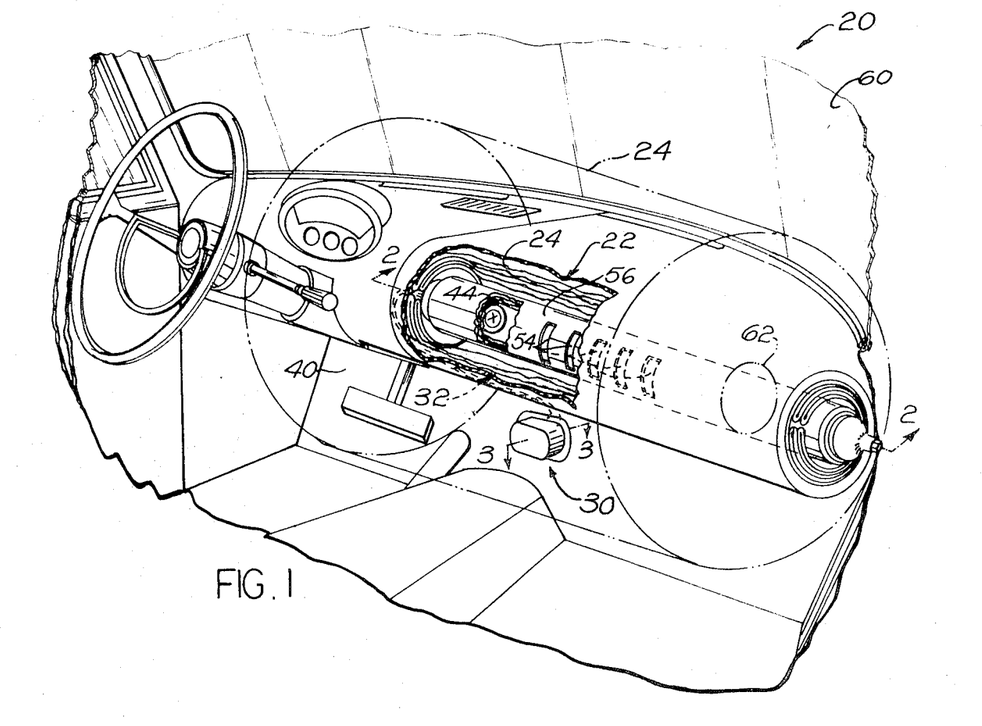
FIG. 1 is a schematic illustration showing a safety apparatus associated with an automotive vehicle.

Referring to FIG. 1, an automotive vehicle 20 is illustrated schematically and includes a safety apparatus 22. The safety apparatus 22 includes a confinement 24 which is inflated, from a collapsed condition, shown in solid lines in FIG. 1, to an expanded condition, shown in dashed lines in FIG. 1, to restrain movement of an occupant of the vehicle during a collision. A collision sensor assembly 30 is connected with the safety apparatus 22 by electrical circuitry 32 and is operative to detect the occurrence of a collision and effect activation of the safety apparatus 22 from the inoperative position to the operative position.

In the present embodiment of the invention, the sensor assembly 30 is mounted on the fire wall 40 of the vehicle 20. However, it is contemplated that the sensor assembly 30 could, if desired, be mounted on another part of the vehicle 20. The fire wall of the vehicle is a particularly desirable location for the sensor assembly 30. Road vibrations are not readily transmitted from the vehicle frame to the fire wall, but during a collision the fire wall still is subjected to deceleration. Moreover, the fire wall 40 is close to the safety apparatus 22 to be activated by the sensor 30, simplifying the installation thereof.

Figure 2:
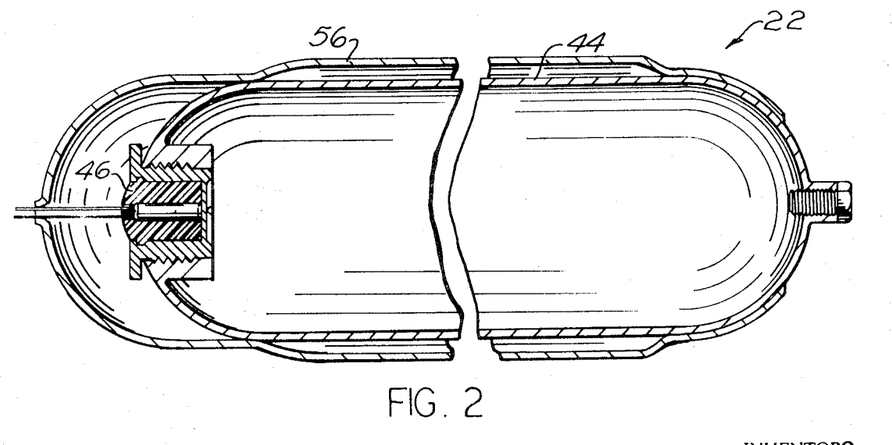
FIG. 2 is a sectional view on an enlarged scale of the safety apparatus of FIG. 1, taken approximately along the section line 2—2 of FIG. 1.

The construction of the safety apparatus 22 is further illustrated in FIG. 2. The safety apparatus 22 may take many forms, but is illustrated herein in the manner disclosed and claimed in copending application Ser. No. 730,024, assigned to the assignee of the present invention. The safety apparatus 22 will not be described in detail. Reference may be made to application Ser. No. 730,024 for a detailed description thereof. However, the safety apparatus 22 includes a fluid supply, in the present instance a reservoir 44 containing fluid under pressure. An explosive charge 46 is associated with the reservoir 44 for forming an opening in the reservoir 44 to enable the fluid to escape therefrom upon the occurrence of a collision. The explosive charge 46 is detonated or activated by operation of the collision sensor assembly 30 upon the occurrence of a collision. Operation of the sensor assembly 30 completes a circuit through the circuitry 32 to conduct current from a source of power, such as a battery 50, to the explosive charge 46 to effect activation of the explosive charge in a known manner.

Upon activation of the explosive charge 46 and the formation of an opening in the fluid reservoir 44, fluid flows through the opening in the reservoir and slots 54 in a diffuser 56 to inflate the confinement 24 from the collapsed condition, shown in FIG. 2, to the expanded condition, shown in dashed lines in FIG. 1. The confinement 24, in the expanded condition, restrains forward movement of the occupant to prevent him from engaging the windshield 60 or other parts of the vehicle 20 under the influence of collision forces. A pressure-responsive blowout assembly 62, of known construction, is provided for forming an aperture in the confinement to minimize rebound of the occupant by enabling fluid to escape from the confinement. This flow of fluid results in the confinement 24 being deflated shortly after the occurrence of the collision.

As noted above, the collision sensor assembly 30 is capable of distinguishing between normally encountered road conditions and a collision. The sensor assembly 30 will operate to an actuated condition when the vehicle encounters a collision which would result in injury to the occupant due to the impact of the occupant with a structural part of the vehicle. Moreover, the construction of the sensor assembly 30 is such that it will not operate to actuate the safety device due to road conditions, even though high magnitude decelerations may be encountered by the vehicle as a result of such road conditions.

The collision sensor 30 (see FIG. 3) includes a housing 66 which may be suitably supported on the fire wall 40 of the vehicle. The housing 66 defines a pair of closed chambers 67, 68 which are generally cylindrical in shape and which have axes lying parallel to each other. The chambers 66, 67 are closed at one end by a base portion 66a of the housing 66, and at the other end by an end wall member 66b of the housing.

The sensor 30 also includes an annular mass 70 located in the chamber 67 and an annular mass 71 located in the chamber 68. The masses 70, 71 are biased against the end wall portion 66b of the housing 66 by springs 72, 73, respectively. The springs 72, 73 are low rate springs, as will be described hereinbelow and have an outside diameter closely approximating the internal diameter of the chambers 67, 68, respectively, to prevent buckling of the springs. The ends of the springs 72, 73 which are associated with the masses 70, 71, respectively, have a reduced diameter portion 70a, 71a wound around the body portion of the respective masses 70, 71. The springs 72, 73 urge the masses 70, 71, respectively, to an initial position (shown in full lines in FIG. 3) against the member 66b.

Figure 3:
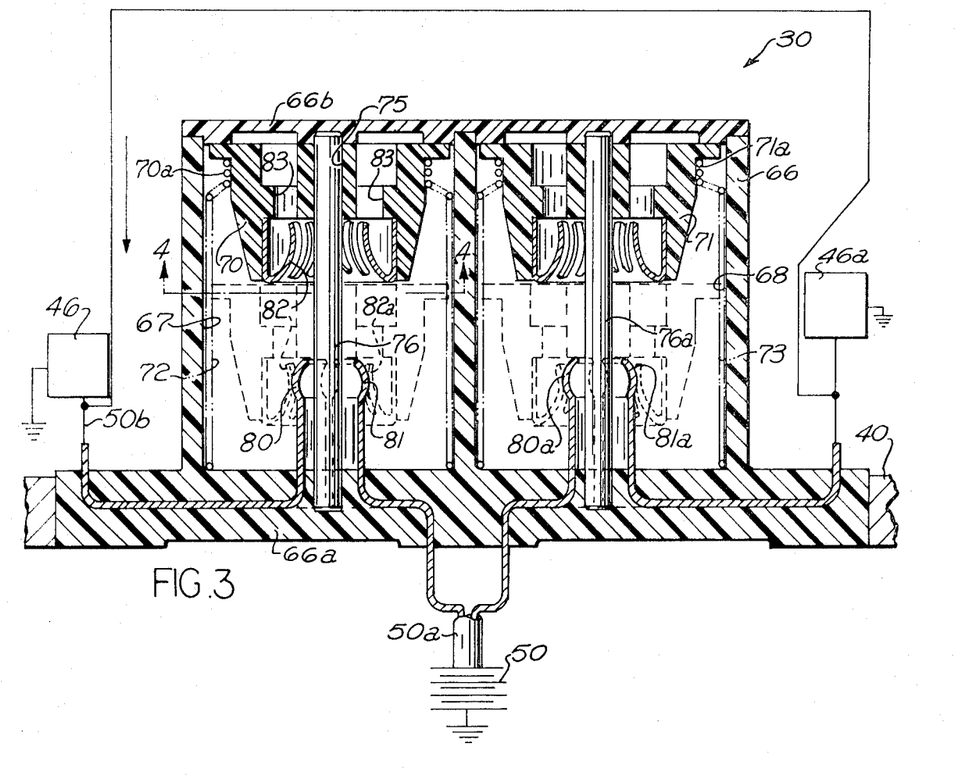
FIG. 3 is a sectional view, taken approximately along section 3—3 of FIG. 1 and illustrating a sensor assembly for detecting the occurrence of a collision and effecting actuation of the safety apparatus upon the occurrence of a collision, and showing schematically circuitry associated with the sensor.
Figure 4:
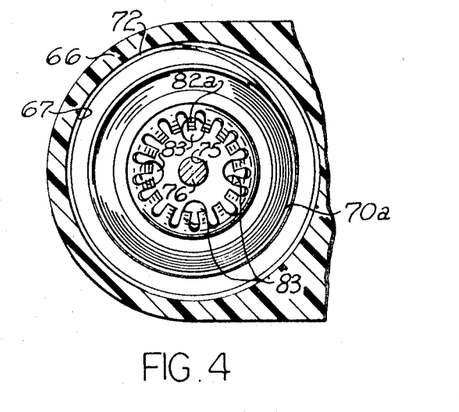
FIG. 4 is a sectional view of the sensor assembly shown in FIG. 3 taken approximately along section line 4—4 of FIG. 3.

The mass 70 has a central opening or bore 75 therethrough through which a rod 76 extends. The opposite ends of the rod 76 are secured in the opposite portions 66a, 66b of the housing 66. The mass 70 is slidable on the rod 76 from the initial position against the bias of spring 72.

Upon the occurrence of a collision, the housing 66 which is mounted on the fire wall 40 of the vehicle is decelerated as a result of the collision, while the mass 70 tends to continue to move due to the inertia or momentum of the mass. The mass 70 moves against the bias of the spring 72 away from the end wall 66b of the housing 66 and moves to an actuated position indicated by dotted lines in FIG. 3. When in the dotted line position of FIG. 3, the mass completes a circuit between contacts 80, 81 which are carried by the portion 66a of the housing 66. This completion of the circuit between the contacts 80, 81 is effected by a contact 82 carried by the mass 70. The contact 82 is an annular ringlike contact member having curved finger portions 82a which engage the ends of the contacts 80, 81 when the mass 70 moves to its actuated position. The contacts 80, 81 cooperate with the contact 82 in a frictional latching manner to lock or hold the mass in the actuated position. Also, because of the frictional engagement of the contacts, the contacts may be self-cleaning.

When the mass 70 moves to its actuated position, the safety device 22 is energized due to the fact that the explosive 46 is energized. This energization of the explosive 46 is effected by the flow of current from the battery 50 through the conductor 50a, contacts 80, 82, and 81, and conductor 50b.

In order to provide for movement of the mass 70 from the initial position in FIG. 3 to the actuated position in FIG. 3, without substantial resistance from the air in the chamber 67, the mass 70 is provided with a plurality of openings 83 therein through which air may freely move as the mass 70 moves from its full-line position to the actuated position. The air as a result provides negligible, if any, resistance to the movement of the mass 70.

The mounting and construction of the mass 71 and operation thereof are identical to that described hereinabove with respect to the mass 70 and, therefore, will not be described in detail. The mass 71, however, as should be apparent, operates in parallel with the mass 70 and completes a parallel circuit when moved to the actuated position, the completion of which circuit energizes another explosive 46a which activates another safety device in the vehicle. Such other safety device could be associated with or mounted on the steering wheel of the vehicle, or could be mounted on any location in the vehicle other than on the dashboard where the safety device 22 is located.

From the above, it should be apparent that upon the occurrence of a head-on collision, which is likely to injure the occupant of the vehicle, the fire wall 40 of the vehicle is decelerated and the housing 66 of the sensor 30 carried thereby is also decelerated. The masses 70, 71 however, continue to move forwardly, relative to the housing, due to the momentum or inertia thereof. The masses 70, 71 will move forwardly upon overcoming the biasing effect of the springs 72, 73. When the masses 70, 71 move to their actuated position, a circuit is completed for energizing the explosives associated with the pair of safety devices located in the vehicle. In the event, however, that the collision is not a head-on collision, but rather occurs at an angle to the forward direction of the vehicle, the safety devices will still be energized as long as forces acting on the housing 66 and the masses 70, 71 are sufficient to cause the masses to move to their actuated positions.

As noted hereinabove, the sensor 30 is capable of distinguishing between conditions encountered by the vehicle during driving of the vehicle and collision conditions. More specifically, the mass 70 moves from its initial position, shown in FIG. 3, a distance which is less than the distance the mass moves when the vehicle becomes involved in a collision which would result in injury to the occupant due to his hitting a structural part of the vehicle. The distance which the mass is displaced as a result of road conditions may be as much as 0.050 inches which would occur due to the vehicle running over severe chuck holes. As is discussed further hereinbelow, the distance that the masses 70, 71 must move in order to effect actuation of the safety device is approximately one-tenth of an inch to 1 inch which is beyond the range of movement of the mass which occurs due to conditions encountered by the vehicle during driving thereof. This distance, of course, is related to the force with which the spring holds the mass against the part 66b. The various parameters of the distance of movement of the mass, spring size, etc., are described below.

Figure 5:
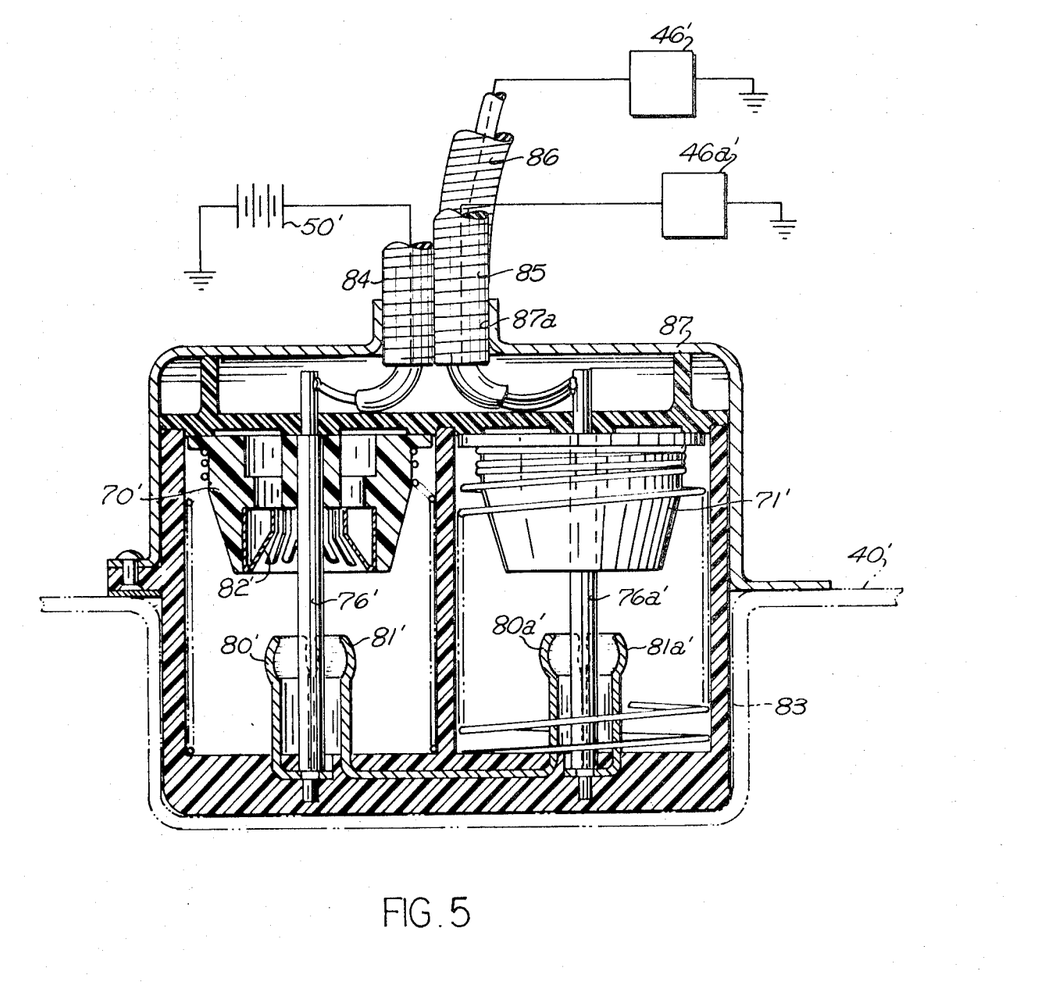
FIG. 5 is a sectional view of a modified sensor for actuating the safety apparatus and showing circuitry associated therewith.

A modified embodiment of the present invention is illustrated in FIG. 5. The embodiment shown in FIG. 5 is generally of the same construction as shown above with respect to FIG. 3, and corresponding reference numerals will be utilized with a prime designation to designate corresponding parts. The sensor shown in FIG. 5 has the basic operating advantages as that described in FIG. 3. The basic structural differences between the sensor assembly of FIG. 5 and that of FIG. 3 described hereinabove is that the contacts which are closed by the masses 70', 71' are in series rather than in parallel. This, of course, requires both masses 70', 71' to be moved to an actuated position in order to effect actuation of the two safety devices which are illustrated as being activated by the sensor assembly shown in FIG. 5.

The sensor assembly of FIG. 5 is shown as being mounted or secured in a pocket or recess 83 in the fire wall 40. The rod 76' which is associated with the mass 70' is an electrical conducting rod and likewise the corresponding rod 76a' associated with the mass 71' is an electrical conducting rod. The circuit associated with the sensor shown in FIG. 5 includes a conductor 84 connected with the battery 50' of the vehicle and which is connected with the conducting rod 76'. The conducting rod 76' is electrically connected with a contact 80'. When the mass 70' moves to its actuated position, it completes a circuit from the contact 80' to the contact 81' which is electrically connected with the contact 80a'. When the mass 71' moves to its actuated position, the contact carried thereby completes a circuit from the contact 80a' to the contact 81a'. The contact 81a' is electrically connected with the rod 76a' on which the mass 71' slides. The rod 76a' in turn is electrically connected with electrical conductors 85, 86 which are connected to activate the safety devices 46, 46a'.

The construction of the sensor shown in FIG. 5 also differs from that in FIG. 3 in that the sensor of FIG. 5 includes an outer shell 87 which may be suitably secured to the fire wall 40 and which is provided with an opening 87a through which the conductors 84, 85 and 86 extend. The shell 87 is crimped securely around the conductors.

Figures 6, 7:
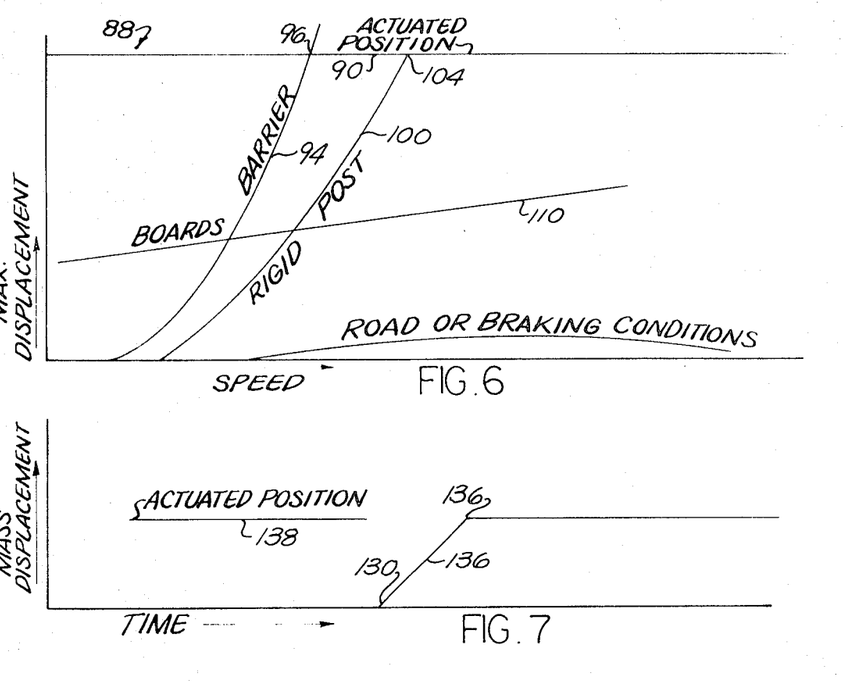

The movement of all the masses 70, 71 and 70', 71' of the sensors of FIGS. 3 and 5, respectively, are identical. Thus the movement of only mass 70 will be described hereinbelow in greater detail. In FIG. 6, a graph 88 illustrates in a general manner the movement of displacement of the mass 70 from the initial position toward the actuated position thereof as a function of the speed at which the vehicle 20 encounters various conditions. Of course, it should be understood that the graph 88 is merely illustrative and, due to the many variables which can effect the mode of displacement of the mass 70, should not be considered as exactly depicting the displacement of any specific mass from the initial position as a function of the speed of any particular vehicle during a given operating condition or collision.

During many minor or low speed collisions or impacts, the collision forces are insufficient to cause injury to an occupant of a vehicle and the safety apparatus 22 need not be operated. Thus, when the vehicle 20 collides with a rigid barrier at a low speed, the collision forces can be readily resisted by the occupant 26 and the average force on the mass 70 is incapable of moving the mass to the actuated position against the influence of the biasing spring 72. Therefore, the mass 70 is not moved through a sufficient distance to engage the contacts 80, 81 and the safety apparatus 22 remains in the inoperative condition shown in solid lines in FIG. 1. This is illustrated by the curve 94 in FIG. 6 wherein the portion of the curve corresponding to a low speed or minor collision with a barrier is below a line 90 depicting the extent of displacement of the mass 70 when it is in the actuated position.

Displacement of the mass 70 increases substantially with increase in the speed at which the vehicle collides with the barrier (this is shown by the relatively steep slope of the curve 94). At a predetermined speed, that is, at a speed corresponding to the point 96 in FIG. 6, the collision could cause injury to the occupant 26 of the vehicle 20 and the mass 70 moves to the actuated position, shown by the intersection of the curve 94 with the line 90 at the point 96. This actuation of the collision sensor 30 results in the safety apparatus 22 being operated to protect the occupant of the vehicle 20 during the collision. Thus, the sensor assembly 30 is not actuated by relatively low impact forces resulting from a minor bumping of the vehicle against a barrier, since the collision forces are insufficient to cause injury to the occupant. However, as the speed of the vehicle increases, the forces resulting from the impact of the vehicle against the barrier increase and at a predetermined speed, corresponding to the point 96, the sensor assembly 30 is actuated to effect operation of the safety apparatus 22 to protect the occupant against the relatively large forces of a collision.

A curve 100 illustrates displacement of the mass 70 when the vehicle 20 engages a rigid post at various speeds. It should be noted that at speeds below the speed represented by a point 104 on the graph 88 the forces are relatively easily resisted by an occupant of the vehicle and are insufficient to cause the mass 70 to move against the influence of the spring 72 to the actuated position. The forces resulting from an impact of a vehicle against a rigid post are usually smaller at any given speed than the collision forces resulting from an impact of the vehicle against a barrier at the same speed. Thus, the speed at which a collision with a post actuates the sensor assembly 30 is higher than the speed at which the sensor assembly is actuated by a collision with a barrier. Accordingly, the speed represented by the point 104 at which the mass 70 is moved to the actuated position by the collision with a post is a higher speed than the speed represented by the point 96 at which the mass 70 moves to the actuated position by a collision with a barrier.

When the vehicle 20 is being driven along a road, it may encounter "chuck" holes or dips and ridges in the road which can subject the vehicle to high instantaneous deceleration. However, the deceleration is at a high frequency, and thus the duration of the deceleration is insufficient to result in injury to the occupant of the vehicle 20. The biasing effect of the spring 72 is such as to retain the mass 70 against movement to the actuated position due to such instantaneous high frequency deceleration. Moreover, the biasing effect of the spring 72 is also such as to retain the mass against movement due to vehicle deceleration as a result of braking. Accordingly, the mass 70 moves through a relatively small distance, illustrated by the curve 108 in FIG. 6, when the vehicle 20 is braked or encounters certain road conditions.

A curve 110 is provided in FIG 6 to illustrate the displacement of the mass 70 when the vehicle 20 encounters particularly severe road conditions which subject the vehicle to impact forces which may, for an instant, be in excess of the impact forces encountered in many collisions. Such a severe road condition was created by stacking boards to a height of over 5 inches and driving the vehicle 20 across the boards. The resultant impact forces and vehicle deceleration were of relatively large magnitude and would have caused the mass 70 to move to the actuated position, if maintained for a substantial period of time. However, these large impact forces were instantaneous in nature and of insufficient duration to effect movement of the mass 70 from the initial position to the actuated position, as illustrated by the curve 110. Thus, even when the vehicle 20 encounters extremely severe road conditions resulting in high instantaneous deceleration, the sensor assembly 30 is not actuated. This is because the high deceleration is of insufficient duration, (i.e., high frequency) to overcome the biasing effect of the spring 72 to cause the mass 70 to move from the initial position to the actuated position.

Figure 8:
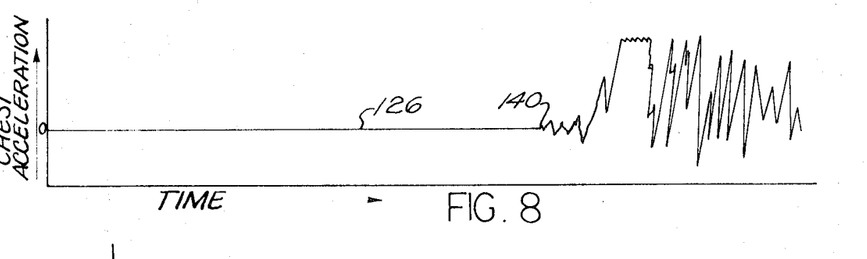
Figure 9:
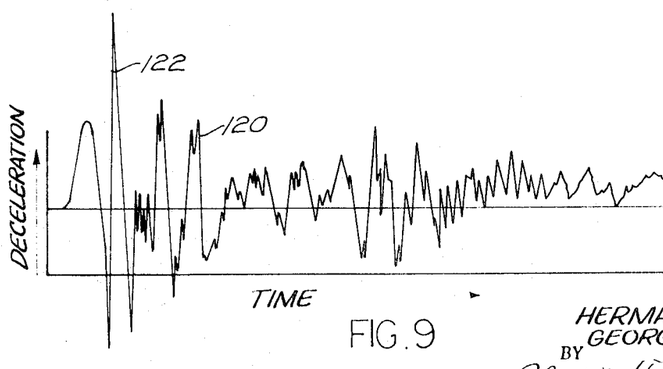

Some of the effects of a collision with a rigid post at a speed sufficient to cause the mass 70 to move to the actuated position, that is, a speed in excess of the speed represented by the point 104 in FIG. 6, are illustrated in FIGS. 7—9. Of course, the graphs of FIGS. 7—9 are to be considered as being merely exemplary or illustrative, since the many variables of any specific collision could result in effects which are somewhat different, although similar to, the illustrated effects. In FIGS. 7—9, the abscissa of each of the graphs is located at a point of time corresponding to the instant at which the vehicle 20 engages the rigid post. The ordinate of the graphs of FIGS. 7, 8 and 9 represents the elapsed time from the instant of engagement of the vehicle with the rigid post. At the instant of engagement of the vehicle with the rigid post, the mass 70 is at substantially zero displacement, as shown in FIG. 7. The chest of the occupant of the vehicle is subjected to substantially zero acceleration, as shown in FIG. 8. Also, the fire wall 40 on which the sensor 30 is mounted is subjected to substantially zero deceleration.

Immediately after engagement of the vehicle with the post, the fire wall 40 begins to decelerate in a manner illustrated by the curve 120 in FIG. 9. It should be noted that a relatively large instantaneous peak deceleration, that is, a deceleration of a very short duration, occurred a relatively short time after engagement of the vehicle with the rigid post, as shown by the high peak 122 of deceleration in FIG. 9. However, the large peak 122 of deceleration and the associated severe impact force is maintained for such a short time on the occupant that the force is insufficient to overcome the inertia of the occupant and the chest acceleration of the occupant relation to the vehicle is substantially zero, as shown by the curve 126 in FIG. 8. Similarly, the forces at the time of the peak deceleration 122 have not exerted sufficient influence on the sensor 30 to cause the mass 70 to overcome the effect of the biasing spring 72. Therefore, due to the short duration of the peak deceleration 122, neither the occupant nor the mass 70 is moved by the relatively large instantaneous deceleration 122.

As time elapses from the instant of the collision, the vehicle continues to be decelerated by the post and the time span over which the deceleration forces are applied to the housing 66 increases until the influence of the biasing spring 72 is overcome, such as at a time indicated at 130 in FIG. 7. The mass 70 then moves away from the member 66b (see FIG. 3) toward the actuated position in a manner generally illustrated by the curve 134 in FIG. 7. At a point of time indicated at 136 in FIG. 7, the mass 70 reaches the actuated position represented by a line 138 in FIG. 7. The mass 70 then completes the electrical circuit between the contacts 80, 81 to effect an activation of the explosive charge 46 and an inflation of the confinement 24 by a flow of fluid from the reservoir 44.

The time which transpires between the instant of impact and the movement of the mass to its actuated position will vary depending upon the vehicle speed at impact and the type of collision which occurs. For certain collisions, it is conceivable that the 0.200 seconds would transpire before the mass moves to its actuated position.

From a comparison of FIGS. 7 and 8, it can be seen that the chest acceleration of the occupant is still substantially zero when the mass 70 moves into the actuated position at the time indicated at 136 in FIG. 7. A relatively short time thereafter, at a time indicated at 140 in FIG. 8, the chest of the occupant accelerates in the manner indicated by the portion of the curve 126 after the time indicated at 140. Thus, it can be seen that the movement of the mass 70 relative to housing 66 under the influence of collision forces is similar or analogous to the movement of the chest of the occupant, with the movement of the mass 70 being slightly ahead of the movement of the chest of the occupant. The location of the mass on the fire wall aids in the mass 70 moving slightly ahead of the occupant. It has been found that a biasing force of between 2 to 16 times the weight of the mass 70 results in response characteristics similar to that of the occupant. Preferably, this biasing force is approximately 5 times the weight of the mass. The biasing force of the spring 72 also serves to hold the mass in the initial position so that it is not affected when the vehicle 20 is braked or encounters severe road conditions to thereby prevent unwanted actuation of the safety apparatus 22.

Actuation of the sensor assembly 30 causes the confinement 24 to be rapidly inflated to the operative or expanded condition shown in dashed lines in FIG. 1. In the expanded condition, the confinement 24 protects the occupant against collision forces as he begins to move forwardly at the point of time indicated at 140 in FIG. 8. The operation of the blowout assembly 62 results in a deflation and collapsing of the confinement 24 a short time after it is inflated to the expanded condition to minimize rebound of the occupant relative to the confinement. Thus, it is important that the mass 70 moves in a manner which is analogous to the movement of the occupant so that the mass 70 moves to the actuated position just before the occupant begins to move forwardly. If the mass 70 responds too quickly to the collision forces and the confinement is inflated too soon, the confinement may be deflated before the occupant begins his forward movement. The safety apparatus 22 is then ineffective to protect the occupant. Of course, if the mass 70 responds too slowly and the confinement is inflated too late, the occupant may be injured by engagement with the vehicle before the confinement is inflated.

As noted above, it has been found that a proper relationship of the mass, spring, and distance of movement of the mass is important for sensor 30 to be capable of distinguishing between the various road conditions encountered by a vehicle and a collision, as discussed above. The mass 70 moves through a distance of between 0.1 of an inch and 1.0 inch between the initial position and the actuated position. The spring 72 exerts a substantially constant biasing force against the mass 70, with the biasing force being at some predetermined value between 2 and 16 times the weight of the mass. If the distance through which the mass is moved from the initial position to the actuated position is less than 0.1 of an inch, the mass may be displaced to the actuated condition by severe road conditions creating an instantaneous (low duration) high deceleration, even though the vehicle 20 has not encountered a collision. If the distance through which the mass 70 is displaced from the initial position to the actuated position is more than 1.0 inch, the time required for the mass to travel the distance will be too great and the safety apparatus 22 will be actuated late. Moreover, if the biasing force of the spring 72 against the mass is too low, the mass may move under the influence of vibrations resulting from road conditions or braking.

The mass 70 is also prevented from moving toward the actuated position under the influence of vibrations from the road conditions by forming the member 66b of an energy-absorbing material having a coefficient of restitution which is less than 0.9 and preferably less than 0.3. If the member 66b was formed of a material having a relatively high coefficient of restitution, for example, a coefficient of restitution in excess of 0.9, the rebound of the mass 70 from the member 66b and vibration of the mass 70 relative to the member 66b could result in the mass being moved to the actuated position, even though the vehicle did not encounter a collision. In the preferred embodiment the housing 66 is made of a material having a relatively low coefficient of restitution, and the member 66b constitutes a stop member which is built into the housing 66. The stop member could, of course, be a separate element made of an energy-absorbing material.

A substantially uniform displacement of the mass 70 toward the actuated position under the influence of collision forces is achieved by the action of the biasing spring 72 which exerts a substantially constant biasing force against the mass. To provide this substantially constant biasing force, the spring 72 is compressed from a free length which is at least four times greater than the length of the spring when the mass 70 is in the initial position shown in FIG. 3. Thus, in the illustrative embodiment of the invention, the spring 72 has a free length of approximately 5.6 inches and is compressed to a length of 0.7 inches in order to preload the mass 70 with the 5 g force urging the mass 70 against the member 66b. This illustrative spring 72 is compressed to a length of 0.2 inches by movement of the mass 70 through a distance of approximately 0.5 inches from the initial position to the actuated position. The spring index of the spring 72 is preferably about 50. Of course, the foregoing dimensions of the spring 72 are merely illustrative and are not to be considered as limiting the scope of the invention to a spring having these dimensions. The natural frequency of the spring mass system, considering the stop 66b removed is preferably about 2—6 cycles per second. The weight of the mass 70 is of the order of 2 to 3 grams but could vary therefrom.

In view of the foregoing, it can be seen that the collision sensor assembly 30 has a mass 70 which moves to an actuated position to effect actuation of the safety apparatus 22. The mass 70 is held against the energy-absorbing stop 66b by the biasing spring 72 which is preloaded to prevent the mass from moving to the actuated position under the influence of forces and vibrations resulting from normal road and braking conditions. The mass 70 moves from the initial position to the actuated position against the influence of the spring 72 as a function of the duration and magnitude of the average deceleration of the housing 75 over an elapsed time interval from the occurrence of the collision. Therefore, the mass 70 is nonresponsive to relatively high deceleration of short duration (i.e., high frequency) similar to those associated with the peak deceleration 122 of FIG. 9, which occurs as a result of severe road conditions. The mass does not move substantially due to high decelerations of short duration due to the low rate spring and the fact that the mass and spring exhibits some properties of a seismic mass system. Of course, if the vehicle 20 was subjected to an impact force of a magnitude equal to the magnitude of the collision forces associated with the peak deceleration 122 for a relatively long period of time, such as by crashing the vehicle into a barrier, the mass 66 would be moved to the actuated position to effect operation of the safety apparatus 22 to protect the occupant.

Since the mass 70 moves relative to the housing 66 in different types of collisions in much the same manner as the occupant moves relative to the vehicle, the sensor assembly 30 is effective to initiate operation of the safety apparatus 22 at the proper time during a collision. Upon the occurrence of any type of collision resulting in the application of forces of sufficient magnitude and duration in the forward direction, the mass 70 moves forwardly relative to the housing 66 to complete a circuit and effect inflation of the confinement 24 immediately before the occupant begins to move forwardly under the influence of the collision forces. This ensures that the confinement is inflated in time to protect the occupant and ensures that the confinement 24 is not deflated before the effect of the collision forces on the occupant are at least partially overcome by penetration or engagement of the occupant with the confinement. Of course, the sensor assembly 30 and safety apparatus 22 could, if desired, be located in orientations other than the one illustrated herein to protect an occupant of a vehicle against collision forces tending to move him in a direction other than the forward direction.

We claim:

1. Apparatus for protecting an occupant of a vehicle from a forceful impact with a structural part thereof as a result of a collision, said apparatus comprising a confinement having a collapsed condition and an expanded condition, said confinement when in said expanded condition being operable to restrain movement of the occupant relative to the vehicle during a collision, structure for providing a supply of fluid for expanding said confinement, and means for activating said structure to effect the flow of fluid to said confinement and including a mass supported for movement relative to the vehicle during a collision in a manner analogous to and immediately preceding movement of the occupant relative to the vehicle during the collision and which mass effects activation of said structure upon a predetermined amount of movement of said mass so that said confinement is expanded to restrain the occupant's movement.

2. Apparatus for protecting an occupant of a vehicle as defined in claim 1 further including first means actuable to effect the flow of fluid from said structure to said confinement, said mass forming a part of a vehicle deceleration sensing means which includes means supporting said mass for movement in said analogous manner, and second means activated by said mass in response to said predetermined amount of movement thereof for activating said first means.

3. Apparatus for protecting an occupant of a vehicle as defined in claim 2 wherein said first means comprises electrically activated means for effecting said flow and said second means comprises electrical contact means which closes upon movement of said mass through said predetermined distance to direct electrical energy to said electrically activated means.

4. Apparatus for protecting an occupant of a vehicle as defined in claim 3 wherein said means for activating said structure further includes spring means for applying a restraining force to said mass urging said mass against movement relative to the vehicle, said spring means being operable to enable said mass to move relative to the vehicle under the influence of forces resulting from collision conditions in said analogous manner.

5. Apparatus for protecting an occupant of a vehicle as defined in claim 1 wherein said means for activating said structure includes biasing means applying a force 2 to 16 times the weight of said mass to said mass and said predetermined amount of movement is 0.1 to 1 inch.

6. Apparatus for protecting an occupant of a vehicle as defined in claim 1 wherein said predetermined amount of movement is not greater than the distance through which said mass travels in 200 milliseconds.

7. Apparatus for protecting an occupant of a vehicle as defined in claim 1 wherein said means for activating said structure further includes an energy-absorbing stop against which said mass is located when in an initial position, and includes biasing means urging said mass against said stop.

8. Apparatus for protecting an occupant of a vehicle from forceful impact with a structural part thereof as a result of a collision, said apparatus comprising a confinement having a collapsed condition and an expanded condition in which said confinement is adapted to restrain movement of the occupant of the vehicle relative to the vehicle during a collision, means for effecting expansion of said confinement, and sensor means for activating said means for effecting expansion of the confinement in response to the occurence of a collision, said sensor means including means mounting said sensor means on the fire wall of the vehicle to at least partially isolate said sensor means from the frame of the vehicle so as to retard transmission of road vibrations from the frame of the vehicle to said sensor means, a mass, means supporting said mass for movement relative to the fire wall of the vehicle from a first position to a second position, means for effecting activation of said means for effecting expansion of said confinement upon movement of said mass to said second position, and means for resisting movement of said mass to the second position under the influence of vibrations transmitted to said mass from the fire wall.

9. A safety apparatus for protecting an occupant of a vehicle from forceful impact with a structural part of the vehicle during a collision, said safety apparatus comprising a confinement operable from a collapsed condition to an expanded condition in which said confinement engages the chest of the occupant of the vehicle to restrain movement of the occupant under the influence of collision forces, first means for providing a supply of fluid for effecting expansion of said confinement, and sensor means for activating said first means in response to the vehicle encountering collision conditions in which the forces applied thereto are of sufficient magnitude and duration to effect substantial acceleration of the chest of the occupant relative to the vehicle, said sensor means being ineffective to effect operation of said confinement to said expanded condition under the influence of noncollision forces applied thereto which are of greater instantaneous magnitude and shorter duration than the collision forces, said sensor means including a housing adapted to be secured to a part of the vehicle which is subjected to deceleration during a collision, a mass supported by said housing for movement relative thereto through a predetermined distance from an initial position to an actuated position upon the occurence of a collision, second means for activating said first means in response to movement of said mass to the actuated position under the influence of collision forces to thereby effect expansion of said confinement, and spring means for urging said mass toward said initial position with a predetermined biasing force which is sufficient to retain said mass against movement through said predetermined distance to said actuated position under the influence of forces resulting from the vehicle encountering noncollision conditions and which forces are of greater instantaneous magnitude and of shorter duration than the collision forces, said spring means being operable to retard movement of said mass to said actuated position under the influence of the collision forces until immediately before the chest of the occupant begins to experience substantial acceleration relative to the vehicle under the influence of collision forces to thereby effect expansion of said confinement to the expanded condition immediately before the chest of the occupant moves through a substantial distance relative to the vehicle.

10. A safety apparatus for protecting an occupant of a vehicle during a collision, wherein the occupant will tend to move from an initial position to a collision position in which injury to the occupant will likely occur if said safety apparatus is not actuated, said safety apparatus comprising an expandable confinement having a collapsed condition and an expanded condition in which said confinement engages the chest of an occupant of the vehicle to restrain movement of the occupant during a collision, means or providing a supply of fluid to effect expansion of said confinement to the expanded condition, and sensor means for activating said fluid supply and effecting expansion of said confinement in response to the occurence of a collision, said sensor means being mounted on a portion of the vehicle which is subjected to deceleration during a collision which is substantially similar to the deceleration the occupant of the vehicle is subjected to during the same collision, said portion of the vehicle being at least partially isolated from the frame of the vehicle so as to retard transmission of road vibrations from the frame of the vehicle to said portion of the vehicle and said sensor means mounted thereon, said sensor means comprising a housing, a mass supported in said housing and movable relative thereto from an initial position to an actuated position in response to collision forces acting thereon, contact means cooperating with said mass when said mass is in said actuated position for activating said means for providing a supply of fluid and expanding of said confinement, and means for biasing said mass toward its initial position to prevent movement of said mass to said actuated position in response to noncollision forces encountered by the vehicle, said means for biasing said mass cooperating with said mass to enable said mass to approximate movement of the occupant under the influence of collision forces and enabling said mass to move in response to collision forces acting thereon to said actuated position before said occupant moves to said collision position.

11. Apparatus for use in actuating a safety device on a vehicle to protect an occupant of the vehicle during a collision, said apparatus comprising a housing adapted to be secured to a part of the vehicle which is subjected to deceleration during a collision, a mass supported in said housing and movable relative thereto through a predetermined distance from an initial position to an actuated position upon the occurence of a collision, said predetermined distance being approximately between 0.1 of an inch and 1 inch, means for actuating the safety device upon movement of said mass relative to said housing to said actuated position, and biasing means urging said mass to said initial position and retaining said mass against movement to said actuated position during deceleration of said housing due to vehicle braking and during vibration thereof resulting from road conditions, and an energy-absorbing stop against which said mass is biased by said biasing means and which absorbs energy upon engagement with said mass to minimize vibration of said mass due to road conditions for preventing a vibration induced actuation of the mass, said biasing means applying a force to said mass when said mass is in said initial position, said biasing force being 2 to 16 times the weight of said mass.

12. Apparatus as set forth in claim 11 wherein said biasing means is a coil spring which has a length when said mass is in said initial position which is less than 25 percent of the free length of the spring to thereby provide a substantially constant spring biasing force as said mass moves.

13. Apparatus as set forth in claim 11 wherein said energy-absorbing stop has a coefficient of restitution which is less than 0.30 to thereby minimize the tendency of said mass to rebound from said energy-absorbing stop.

14. Apparatus as set forth in claim 11 wherein said means for actuating said safety device includes electrical contacts closed upon movement of said mass to said actuated position.